UNITED STATES PATENT OFFICE.

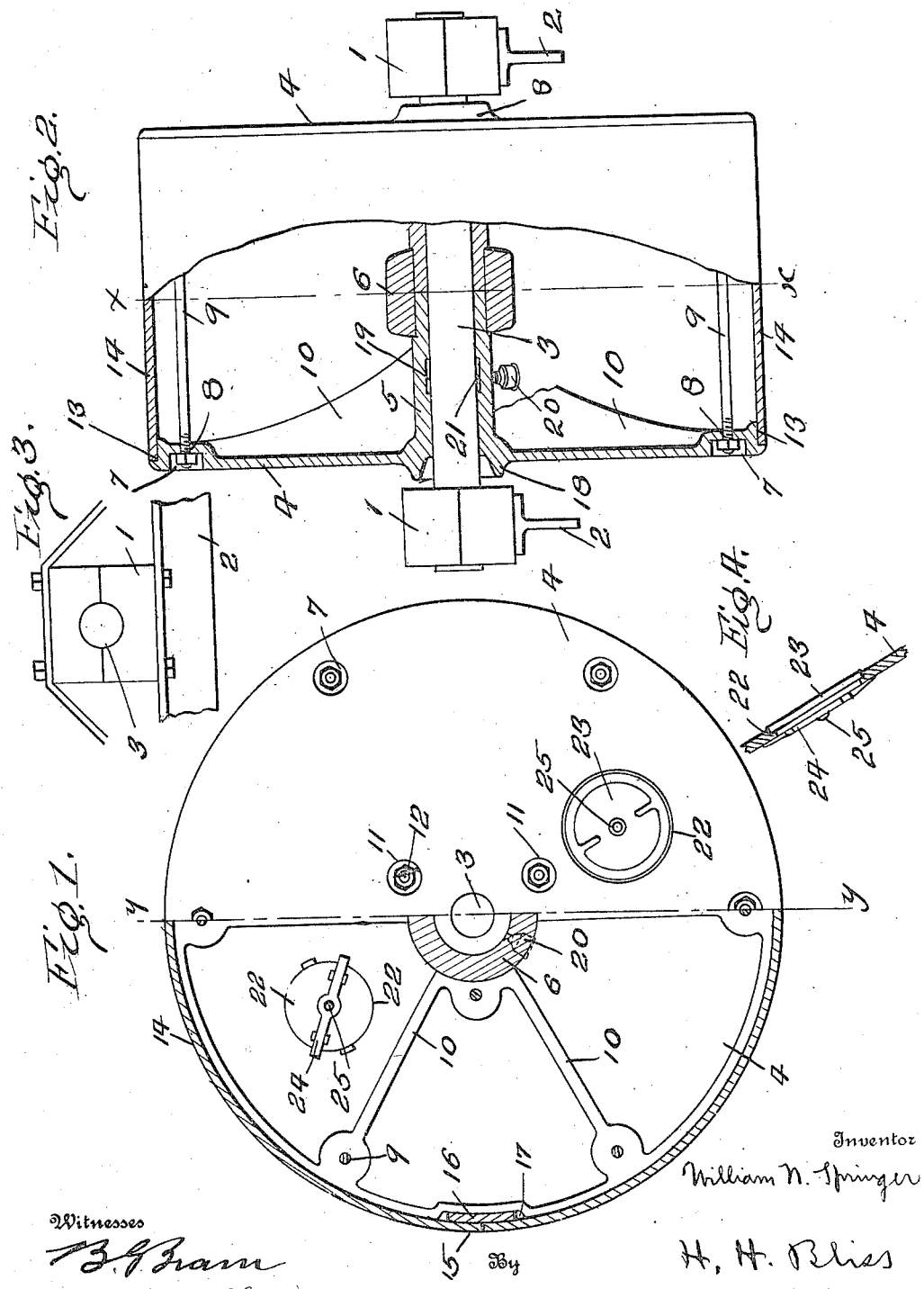

WILLIAM N. SPRINGER, OF PEORIA, ILLINOIS, ASSIGNOR TO AVERY COMPANY, A CORPORATION OF ILLINOIS.

WHEEL FOR STEAM-PLOWS AND THE LIKE 1,068,463.          Specification of Letters Patent.        Patented July 29, 1913.

Application filed May 14, 1909. Serial No. 496,049.

*To all whom it may concern:*

Be it known that I, WILLIAM N. SPRINGER, a citizen of the United States, residing at Peoria, in the county of Peoria and State of Illinois, have invented certain new and useful Improvements in a Wheel for Steam-Plows and the Like, of which the following is a specification, reference being had therein to the accompanying drawing.

This invention relates to improvements in ground wheels adapted for use on steam plows or other machines of like character.

The objects of the invention are to provide a wheel of this type, strong and simple in construction and having improved means for lubrication.

Other objects will appear in the following specification.

Of the drawings, Figure 1 is a side view of a wheel embodying my invention. The left hand portion of the wheel is shown in cross section along the line $x$—$x$ of Fig. 2. Fig. 2 is a cross sectional elevation of the wheel along the line $y$—$y$ of Fig. 1. Fig. 3 is a side view showing the support for the wheel. Fig. 4 is a fragmentary cross sectional view of one of the side plates and shows a hand hole plate in position.

Referring to the drawings, 1, 1 are supporting boxes and are mounted upon the frame members 2, 2 of the plow or other machine.

3 is a circular shaft or axle rigidly mounted in the boxes 1, 1.

4, 4 are circular side plates and are formed, preferably, integrally with the inward extending hubs 5, 5. These hubs are bored to receive the shaft 3 and to turn upon it with a good running fit. The inner ends of the hubs 5, 5 are turned to such a size that they will enter the cast iron ring 6 with a forced fit.

7—7 represent a series of pockets formed in the side plates at points near the outer peripheries. The holes 8—8 are drilled at the bottom of these pockets to receive the threaded tie-rods 9—9. These tie-rods are provided with nuts at each end, by means of which the two side plates may be drawn toward each other.

10—10 are flat ribs extending radially from the hubs 5, 5 and are preferably located in the same planes with the pockets 7—7 and the tie-bolts 9—9. These ribs are preferably wider at their inner ends than at their outer ends and are so proportioned that they will act as cantaliver beams of approximately uniform strength.

11—11 represent a series of supplementary pockets, similar to the pockets 7—7. These are formed as close as practical to the hubs and are preferably located between each alternate pair of the ribs 10, 10. They are provided with tie bolts 12—12, similar to the tie bolts 9—9.

The side plates 4—4 have peripheral grooves or notches 13, 13 adapted to receive the tire 14. The tire is preferably formed of a single piece of sheet steel. In the drawings I have shown this tire as having its ends joined at 15 by means of the butt-strap 16, to which the ends are riveted. The grooves 13, 13 are provided with recesses 17, 17 to receive the butt-strap 16, and by its engagement with the sides of these recesses the butt-strap serves as a key to prevent the rotation of the tire relative to the side plates. If preferred, however, the tire may be rolled into a continuous band from a single piece of metal. In this case, the butt-strap 16 and the recesses 17, 17 would of course, be unnecessary.

The side plates are provided with the laterally extending collars 18, 18. These collars serve to receive any end thrust of the wheel against the boxes and also serve to deflect the dirt and rubbish away from the point where the shaft emerges from the wheel.

Each of the hubs 5, 5 is provided with an oil or grease chamber 19. Any suitable means for supplying oil or grease to this chamber may be used. For purposes of illustration, however, I have shown a pressure grease cup 20, connected to each chamber by means of the oil hole 21. Each side plate 4, 4 is provided with a hand hole 22, the two hand holes being preferably located on opposite sides of the axis of the wheel.

23, 23 are hand hole covers adapted to tightly close the hand holes. These covers are held in place by the yokes 24, 24 and the bolts 25, 25. In this way, the space within the wheel is entirely inclosed and no dust or dirt can enter. When it is necessary to obtain access to the interior of the wheel to replenish the supply of lubricant or to adjust the lubricating devices, this may be readily done by removing whichever of the hand hole covers is uppermost. The lubricating devices are preferably located in a plane at an angle to the plane of the hand holes in order that they may be reached equally well from either hand hole.

In constructing and assembling, the ring 6 should preferably be forced in place over one of the hubs, the tire then placed in position, and the other hub then forced into the ring 6, the corresponding side plate being thus brought into engagement with the tire. The tie-rods 9—9 and 11—11 may then be put in place and the nuts tightened. The whole wheel will thus be securely clamped together. The holes through the hubs for the shaft 3 should preferably not be bored until after the wheel is assembled. This will insure perfect alinement of the holes through the two hubs, and any subsequent displacement is made impossible by the ring 6.

What I claim is—

1. In a wheel, two side members each having an inwardly extending hub and bracing ribs, a tire between the side members and tie rods for clamping the side members in position relative to the tire, each tie rod being located in the plane of a rib, substantially as set forth.

2. In a wheel, a tire formed with a butt-strap joint and two side members each having a groove to receive the tire, and each having a recess to receive the butt-strap, the sides of the recess engaging the butt-strap to prevent the rotation of the tire relative to the side members, substantially as set forth.

3. In a wheel, the combination of a tire, two side plates each having a hand hole, the hand holes being located at opposite sides of the wheel axis, covers for the hand holes, and lubricating means for the axle bearing of the wheel located at a point within the wheel substantially equi-distant from the hand holes, whereby it can be reached equally well from either hand hole, substantially as set forth.

4. In a wheel, two separate sections each having a hub with a bearing aperture, a tire clamped between the two sections, and a ring supplemental to the tire engaging the hub for holding the bearing apertures in alinement, substantially as set forth.

In testimony whereof I affix my signature, in presence of two witnesses.

WILLIAM N. SPRINGER.

Witnesses:
E. M. VOORHEES,
J. L. COLLYER.